US012603396B2

(12) United States Patent
Han et al.

(10) Patent No.: US 12,603,396 B2
(45) Date of Patent: Apr. 14, 2026

(54) ELECTRODE ASSEMBLY, METHOD FOR MANUFACTURING THE SAME AND SECONDARY BATTERY

(71) Applicant: LG ENERGY SOLUTION, LTD., Seoul (KR)

(72) Inventors: Song Yi Han, Daejeon (KR); Ji Hoon Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 581 days.

(21) Appl. No.: 17/792,363

(22) PCT Filed: Apr. 27, 2021

(86) PCT No.: PCT/KR2021/005325
§ 371 (c)(1),
(2) Date: Jul. 12, 2022

(87) PCT Pub. No.: WO2021/235719
PCT Pub. Date: Nov. 25, 2021

(65) Prior Publication Data
US 2023/0031275 A1     Feb. 2, 2023

(30) Foreign Application Priority Data
May 22, 2020     (KR) ........................ 10-2020-0061375

(51) Int. Cl.
H01M 50/533     (2021.01)
H01M 4/139     (2010.01)
(Continued)

(52) U.S. Cl.
CPC ......... H01M 50/533 (2021.01); H01M 4/139 (2013.01); H01M 4/38 (2013.01);
(Continued)

(58) Field of Classification Search
CPC ............. H01M 50/533; H01M 50/102; H01M 50/528; H01M 50/531; H01M 50/131;
(Continued)

(56) References Cited

U.S. PATENT DOCUMENTS 9,077,027 B2     7/2015   Heo
2006/0188777 A1     8/2006   Kaneta
(Continued)

FOREIGN PATENT DOCUMENTS

CN     1830114 A     9/2006
CN     101593849 A     12/2009
(Continued)

OTHER PUBLICATIONS

JP2019133901A English Translation (Year: 2019).*
(Continued)

*Primary Examiner* — Allison Bourke
*Assistant Examiner* — Travis L. Martin
(74) *Attorney, Agent, or Firm* — Birch, Stewart, Kolasch & Birch, LLP

(57)     ABSTRACT

An electrode includes a first electrode and a second electrode alternately stacked with a separator therebetween. The first electrode a first-a electrode and a first-b electrode, in which electrode active material layers have thicknesses different from each other.

8 Claims, 13 Drawing Sheets

(51) Int. Cl.

| | | |
|---|---|---|
| *H01M 4/38* | (2006.01) | |
| *H01M 10/04* | (2006.01) | |
| *H01M 50/102* | (2021.01) | |

(52) U.S. Cl.

CPC ... *H01M 10/0413* (2013.01); *H01M 10/0436* (2013.01); *H01M 50/102* (2021.01)

(58) Field of Classification Search

CPC .. H01M 50/133; H01M 50/105; H01M 4/139; H01M 4/38; H01M 4/0407; H01M 10/0413; H01M 10/0436; H01M 10/0585; H01M 10/04; H01M 10/441; H01M 2004/021; H01M 2220/20; Y02E 60/10; Y02P 70/50

See application file for complete search history.

(56) References Cited

U.S. PATENT DOCUMENTS

| | | | |
|---|---|---|---|
| 2007/0166611 | A1 | 7/2007 | Oh et al. |
| 2010/0261064 | A1 | 10/2010 | Oh et al. |
| 2012/0164520 | A1 | 6/2012 | Choi |
| 2013/0017425 | A1 | 1/2013 | Watanabe et al. |
| 2013/0143109 | A1 | 6/2013 | Kim et al. |
| 2014/0072850 | A1 | 3/2014 | Kwon et al. |
| 2014/0120394 | A1 | 5/2014 | Kwon et al. |
| 2014/0120397 | A1 | 5/2014 | Kim et al. |
| 2014/0234682 | A1 | 8/2014 | Kwon et al. |
| 2014/0255743 | A1 | 9/2014 | Kwon et al. |
| 2014/0255762 | A1 | 9/2014 | Lee et al. |
| 2015/0010799 | A1 | 1/2015 | Kwon et al. |
| 2015/0118532 | A1 | 4/2015 | Kim et al. |
| 2015/0221988 | A1 | 8/2015 | Kwon et al. |
| 2015/0244019 | A1 | 8/2015 | Kwon et al. |
| 2015/0340731 | A1 | 11/2015 | Kim et al. |
| 2018/0123187 | A1* | 5/2018 | Ho ........................ H01M 10/44 |
| 2019/0013506 | A1* | 1/2019 | Park ...................... H01M 10/04 |
| 2020/0127276 | A1 | 4/2020 | Kim et al. |
| 2021/0296740 | A1* | 9/2021 | Yang ................. H01M 10/4257 |
| 2022/0200068 | A1* | 6/2022 | Park ...................... H01M 10/48 |

FOREIGN PATENT DOCUMENTS

| | | | |
|---|---|---|---|
| CN | 103066239 | A | 4/2013 |
| CN | 103119754 | A | 5/2013 |
| CN | 104412438 | A | 3/2015 |
| JP | 5861589 | B2 | 2/2016 |
| JP | 2018-92712 | A | 6/2018 |
| JP | 2018-98154 | A | 6/2018 |
| JP | 2019-133901 | A | 8/2019 |
| KR | 10-0726065 | B1 | 6/2007 |
| KR | 10-2012-0072575 | A | 7/2012 |
| KR | 10-2013-0007992 | A | 1/2013 |
| KR | 10-1336309 | B1 | 12/2013 |
| KR | 10-2015-0045161 | A | 4/2015 |
| KR | 10-2015-0049635 | A | 5/2015 |
| KR | 10-1526513 | B1 | 6/2015 |
| KR | 10-2015-0134162 | A | 12/2015 |
| KR | 10-1575984 | B1 | 12/2015 |
| KR | 10-1577494 | B1 | 12/2015 |
| KR | 10-2017-0001374 | A | 1/2017 |
| KR | 10-1897108 | B1 | 9/2018 |
| KR | 10-2020-0043612 | A | 4/2020 |
| WO | WO 2015/037560 | A1 | 3/2015 |

OTHER PUBLICATIONS

JP2019133901A translation (Year: 2019).*

International Search Report for PCT/KR2021/005325 (PCT/ISA/210) mailed on Aug. 6, 2021.

Extended European Search Report for European Application No. 21809324.3, dated Dec. 11, 2023.

* cited by examiner

ELECTRODE ASSEMBLY, METHOD FOR MANUFACTURING THE SAME AND SECONDARY BATTERY

CROSS-REFERENCE TO RELATED APPLICATION

The present application claims the benefit of the priority of Korean Patent Application No. 10-2020-0061375, filed on May 22, 2020, which is hereby incorporated by reference in its entirety.

TECHNICAL FIELD

The present invention relates to an electrode assembly capable of satisfying both energy density and output performance, a method for manufacturing the same, and a secondary battery.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which electrodes and separators are alternately stacked, and a pouch accommodating the electrode assembly.

Since it is important to maximize energy density of secondary batteries for EVs, most of electrodes are being designed with high loading. Also, it is important to improve output performance of the secondary batteries for the HEVs, the electrodes are being designed with low loading.

Here, there is a need for new technologies capable of satisfying both opposite characteristics, i.e., the energy density and the output due to an increase in use of the secondary battery.

DISCLOSURE OF THE INVENTION

Technical Problem

The present invention is invented to solve the above problems, and an object of the present invention is to provide an electrode assembly capable of satisfying both energy density and an output, a method for manufacturing the same, and a secondary battery.

Technical Solution

The present invention for achieving the above object provides an electrode assembly, in which a first electrode having an electrode active material layer and a second electrode having an electrode active material layer are alternately stacked with a separator therebetween, wherein the first electrode includes a first-a electrode and a first-b electrode in which the electrode active material layers have thicknesses different from each other.

The electrode active material layer of the first-a electrode and the electrode active material layer of the first-b electrode may have the same area, and the electrode active material layer of the first-a electrode may be thicker than the electrode active material layer of the first-b electrode.

The number of the first-a electrodes may be more than a number of the first-b electrodes.

The first-a electrode and the first-b electrode may comprise a first-a electrode tab and a first-b electrode tab, respectively, and the first-a electrode tab and the first-b electrode tab may have different widths.

The first-b electrode tab may have a width greater than a width of the first-a electrode tab.

The electrode assembly may further comprise an electrode lead, which comprises a first electrode lead, to which the first-b electrode tab and the first-a electrode tab are bonded, and a second electrode, to which the second electrode tab of the second electrode is bonded.

The first-b electrode tab and the first-a electrode tab may be respectively bonded to a first side and a second side of the first electrode lead without being in direct contact with each other.

The first electrode may further comprise a first-c electrode having a same area as each of the first-a electrode and the first-b electrode and having an electrode active material layer, which has a thickness different from that of the electrode active material layer of each of the first-a electrode and the first-b electrode, and the electrode active material layer of the first-c electrode may have a thickness less than the thickness of the electrode active material layer of the first-b electrode.

The first-c electrode may comprise a first-c electrode tab, and the first-c electrode tab may have a width greater than the width of the first-b electrode tab.

A method for manufacturing an electrode assembly according to the present invention comprises: a first electrode manufacturing step (S10) of manufacturing a first electrode comprising a first-a electrode and a first-b electrode, in which electrode active material layers have different thicknesses; and an electrode assembly manufacturing step (S20) of alternately stacking a second electrode and the first-a electrode or the first-b electrode of the first electrode with a separator therebetween to manufacture the electrode assembly.

The first electrode manufacturing step may comprise preparing a plurality of collectors having a same area and changing a loading amount of electrode active material on a surface of each of the plurality of collectors, wherein the first-a electrode may increase in loading amount of electrode active material compared to the electrode active material of the first-b electrode to manufacture an electrode active material layer having a thickness greater than that of the first-b electrode, and the first-b electrode may decrease in loading amount of electrode active material compared to the electrode active material of the first-a electrode to manufacture an electrode active material layer having a thickness less than that of the first-a electrode.

In the first electrode manufacturing step, non-coating portions, on which the electrode active material does not exist, of the first-a electrode and the first-b electrode may be cut to manufacture a first-a electrode tab and a first-b electrode tab, wherein the first-b electrode tab may have a width greater than a width of the first-a electrode tab.

In the electrode assembly manufacturing step (S20), the first electrode may be provided so that a number of the first-a electrodes is less than a number of the first-b electrodes.

The method may further comprise, after the electrode assembly manufacturing step (S20), an electrode lead bonding step (S30) of bonding the first-a electrode tab and the first-b electrode tab to a first electrode lead and bonding a second electrode tab of the second electrode to a second electrode lead, wherein the first-a electrode tab and the first-b electrode tab may be respectively bonded to a first side and a second side of the first electrode lead without being in direct contact with each other.

A secondary battery according to the present invention comprises: an electrode assembly; and a case configured to accommodate the electrode assembly.

Advantageous Effects

In the electrode assembly according to the present invention, the first electrode and the second electrode may be stacked with the separator therebetween. The first electrode may comprise the first-a electrode and the first-b electrode, in which the electrode active material layers have the thicknesses different from each other. Due to the above-described characteristic, the electrode assembly capable of satisfying both the energy density and the output may be obtained.

In addition, in the electrode assembly according to the present invention, the electrode active material layer of the first-a electrode and the electrode active material layer of the first-b electrode may have the same area, and the electrode active material layer of the first-a electrode may be provided to be thicker than the electrode active material layer of the first-b electrode. That is, the energy density may increase through the first-a electrode, in which the electrode active material layer has the thick thickness, and the output performance may be improved through the first-b electrode having the thin thickness. Thus, the electrode assembly according to the present invention may satisfy both the energy density and the output performance.

In addition, in the electrode assembly according to the present invention, the large number of first-a electrodes compared to that of first-b electrodes are stacked. Due to the above-described characteristic, the energy density may be sufficiently secured.

In addition, in the electrode assembly according to the present invention, the first-a electrode and the first-b electrode may comprise the first-a electrode tab and the first-b electrode tab, respectively. The first-a electrode tab and the first-b electrode tab may have the different widths. Particularly, the first-b electrode tab may have the width greater than that of the first-a electrode tab. Due to the above-described characteristic, the large amount of current may be induced to flow through the first-b electrode tab, and thus, the output performance of the electrode assembly may be stably improved.

MODE FOR CARRYING OUT THE INVENTION

Figure 1:
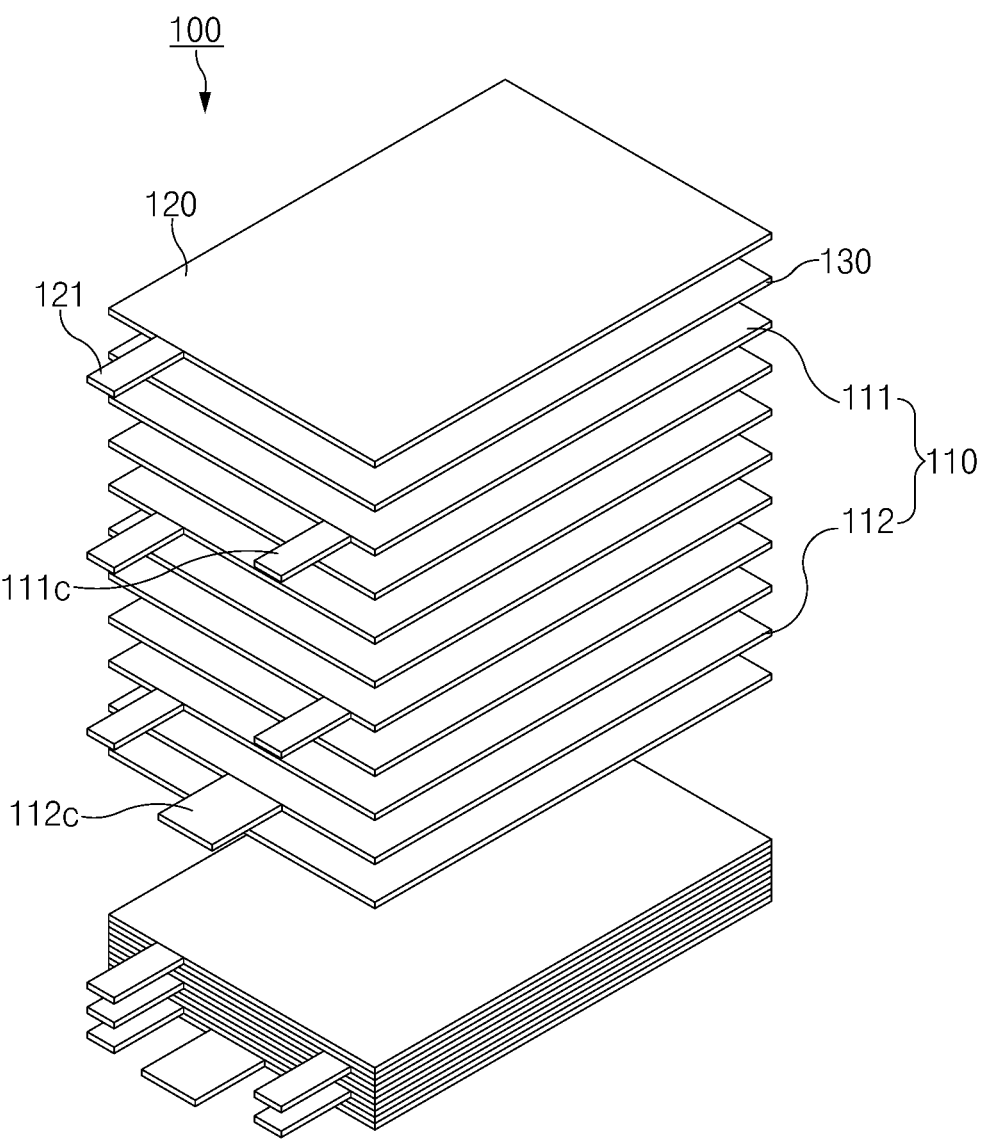
FIG. 1 is a perspective view of an electrode assembly according to a first embodiment of the present invention.
Figure 2:
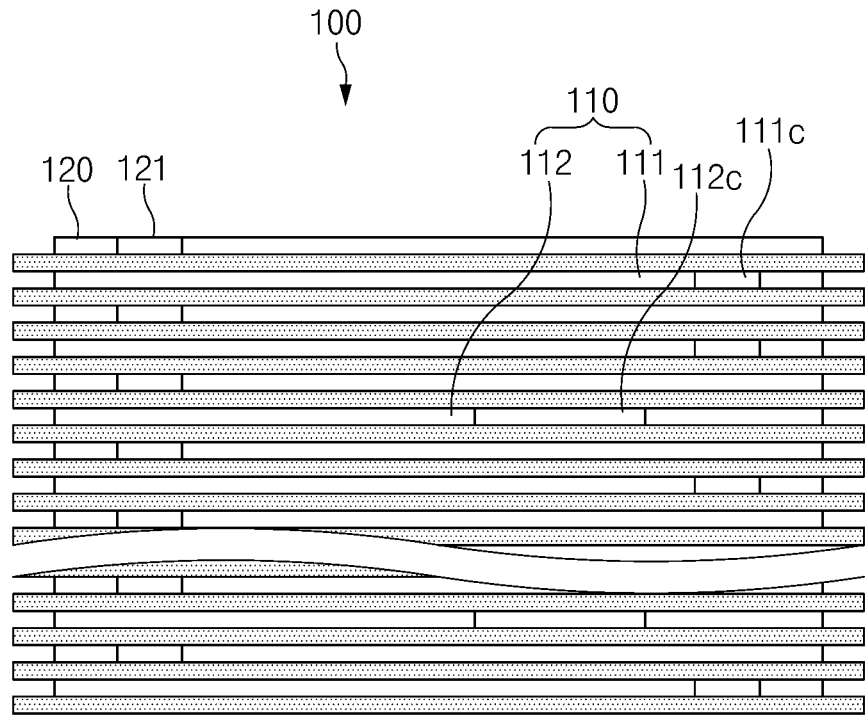
FIG. 2 is a front view of the electrode assembly according to the first embodiment of the present invention.
Figure 3:
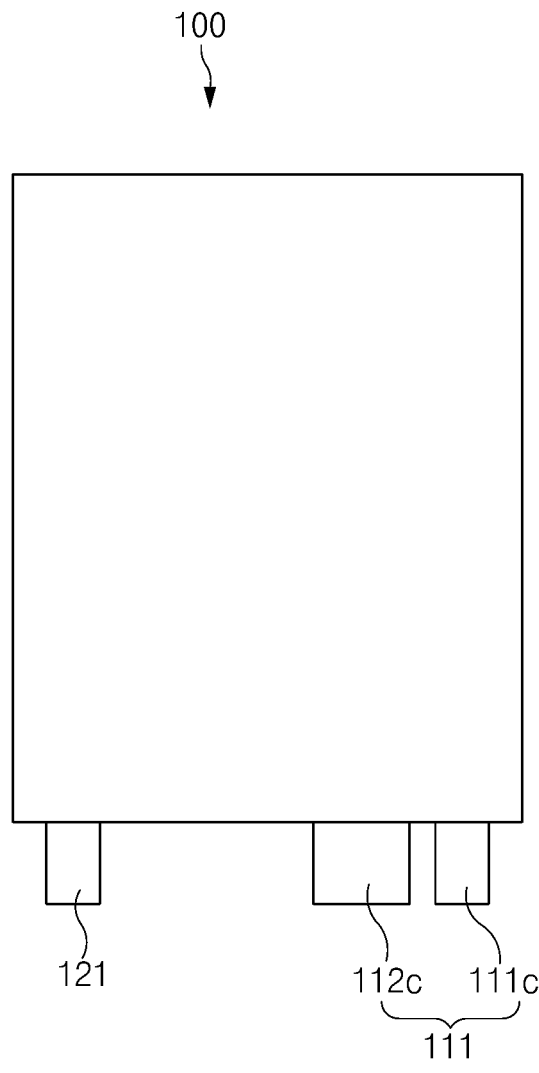
FIG. 3 is a plan view of the electrode assembly according to the first embodiment of the present invention.
Figure 4:
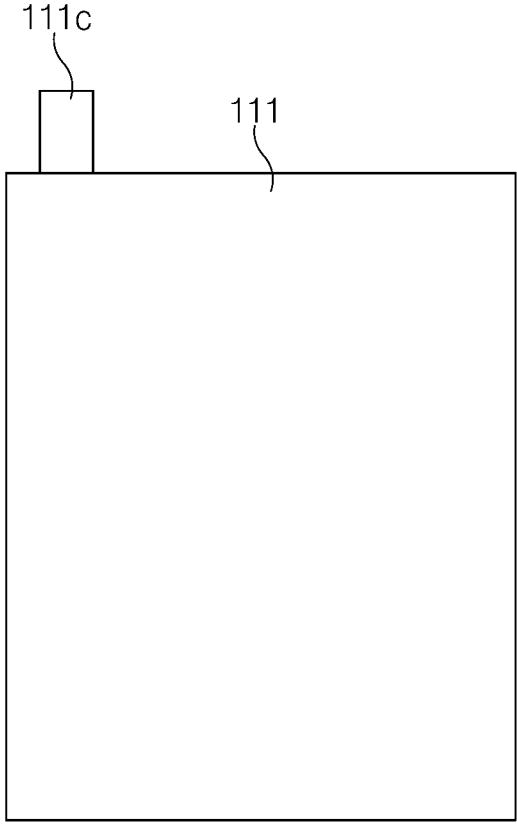
FIG. 4 is a plan view illustrating a first-a electrode of a first electrode in the electrode assembly according to the first embodiment of the present invention.
Figure 5:
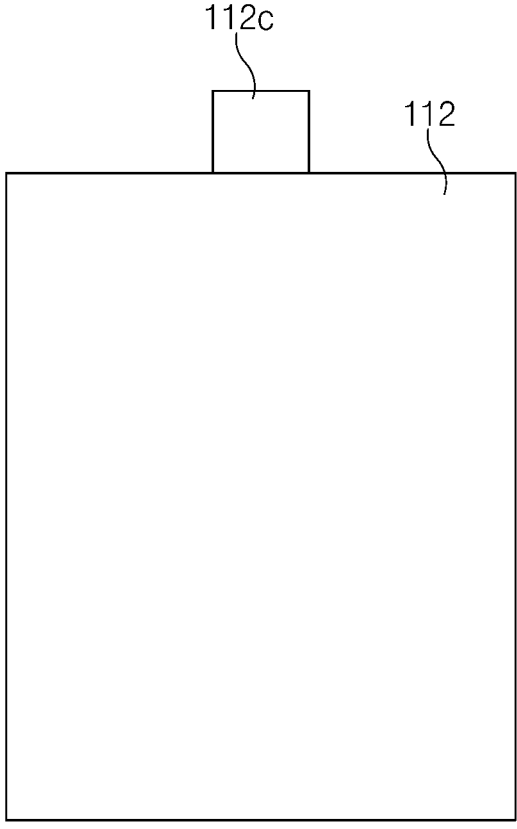
FIG. 5 is a plan view illustrating a first-b electrode of the first electrode in the electrode assembly according to the first embodiment of the present invention.
Figure 6:
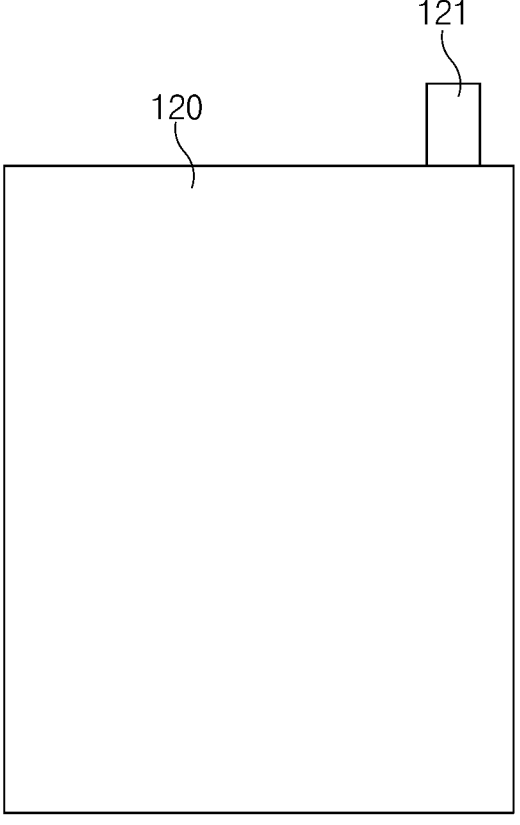
FIG. 6 is a plan view of a second electrode in the electrode assembly according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Electrode Assembly According to First Embodiment of the Present Invention

As illustrated in FIGS. 1 to 8, an electrode assembly 100 according to a first embodiment of the present invention has a structure in which a first electrode 110 and a second electrode 120 are alternately stacked with the separator 130 therebetween.

Here, the first electrode 110 comprises a first-a electrode 111 and a first-b electrode 112, in which electrode active material layers have thicknesses different from each other. That is, the first-a electrode 111 and the first-b electrode 112 may be provided as an electrode having high energy density and an electrode having high output performance due to a difference in thickness between the electrode active material layers. As a result, when the electrode assembly comprises the first-a electrode 111 and the first-b electrode, both the energy density and the output performance may be improved.

Here, in the first electrode 110, the electrode active material layer of the first-a electrode 111 and the electrode active material layer of the first-b electrode 112 have the same area, and the electrode active material layer of the first-a electrode 111 has a thickness greater than that of the electrode active material layer of the first-b electrode 112. Thus, since the electrode active material layer of the first-b electrode 111 has the thickness greater than that of the electrode active material layer of the first-b electrode 112, the first-a electrode 111 has energy density greater than that of the first-b electrode. Also, since the electrode active material layer of the first-b electrode 112 has the thickness less than that of the electrode active material layer of the first-a electrode 111, the first-b electrode 112 may have output performance greater than that of the first-a electrode 111. Therefore, the energy density and the output performance may be simultaneously obtained by changing the thickness of the electrode active material layer of the first-a electrode 111 and the thickness of the electrode active material layer of the first-b electrode 112.

Figure 7:
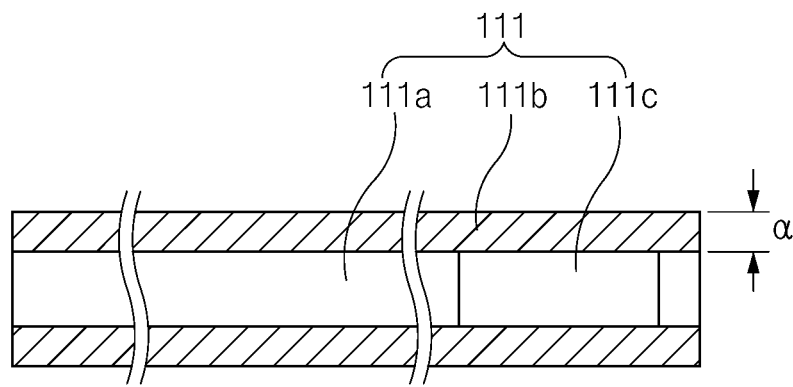
FIG. 7 is a front view illustrating a first-a electrode and a first-b electrode of the first electrode in the electrode assembly according to the first embodiment of the present invention.
Figure 7:
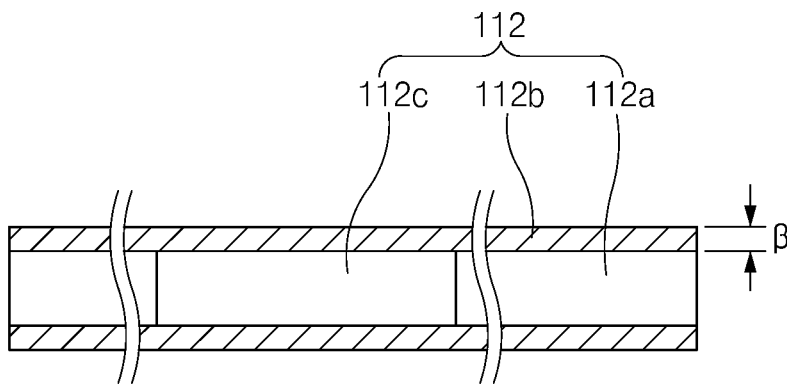
Figure 8:
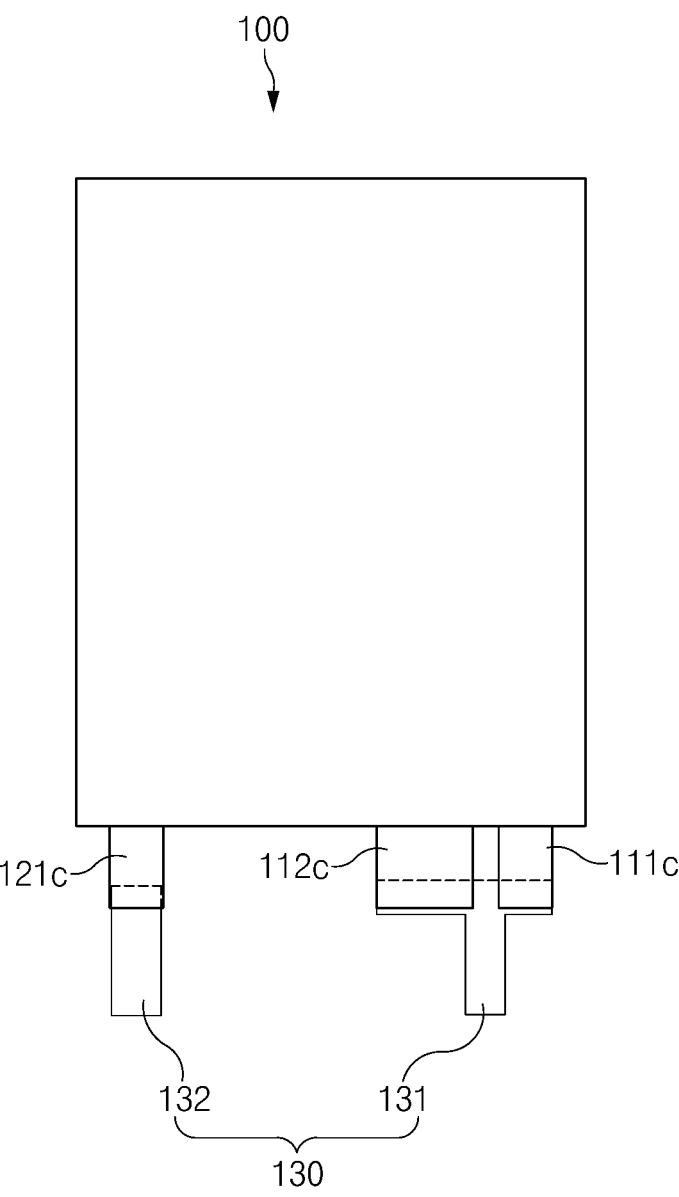
FIG. 8 is a plan view illustrating a state, in which an electrode lead is provided, in the electrode assembly according to the first embodiment of the present invention.

For example, referring to FIG. 7, the first-a electrode 111 comprises a collector 111*a* and an electrode active material layer 111*b* applied on a surface of the collector 111*a*. The first-b electrode 112 comprises a collector 112*a* and an electrode active material layer 112*b* applied on a surface of the collector 112*a*. The collector 111*a* of the first-a electrode 111 and the collector 112*a* of the first-b electrode 112 have the same material, size, and thickness. The electrode active material layer 111*b* of the first-a electrode 111 and the electrode active material layer 112*b* of the first-b electrode 112 are provided to have the same area and material.

Here, the electrode active material layer of the first-a electrode 111 has a thickness α greater than a thickness β of the electrode active material layer of the first-b electrode 112. Thus, the first-a electrode 111 has energy density greater than that of the first-b electrode, and the output performance of the first-b electrode 112 is improved.

When the first electrode 110 and the second electrode 120, which have the first-a electrode and the first-b electrode, are stacked, the number of first-a electrode 111 may be greater than that of first-b electrode 112. That is, since it is important to maximize energy density of a battery for an EV, the large number of first-a electrodes 111 having high energy density compared to the number of first-b electrodes 112 are stacked. Therefore, the output performance may be secured, and also, the energy density may maximally increase.

For example, when manufacturing an electrode assembly in which 25 sheets of first electrode 110 and 25 sheets of second electrode 120 are stacked to manufacture the electrode assembly, 22 sheets of first-a electrode 111 and 3 sheets of first-b electrode 112 may be stacked to sufficiently secure the energy density.

Therefore, the electrode assembly 100 according to the first embodiment of the present invention comprises the first-a electrode 111 having high energy density and the first-b electrode 112 having high output performance, and thus, the energy density and the output performance may be obtained at the same time.

In the electrode assembly 100 according to the first embodiment of the present invention, the first-a electrode 111 and the first-b electrode 112 comprise a first-a electrode tab 111*c* and a first-b electrode tab 112*c*, respectively. Here, the first-a electrode tab 111*c* and the first-b electrode tab 112*c* have different widths, and thus, a difference in resistance between the electrodes may be intentionally adjusted. That is, the first-b electrode tab 112*c* of the first-b electrode 112 has the same length as and a width greater than that of the first-a electrode tab 111*c* of the first-a electrode 111. Thus, a large amount of current may be induced to flow preferentially through the first-b electrode tab 112*c* having high output performance, and a small amount of current may be induced to the first-a electrode tab 111*c* having high energy density.

Thus, the widths of the first-a electrode tab 111*c* and the first-b electrode tab 112*c* may be differently applied so that a large amount of current is induced to the first-b electrode 112, and as a result, the output performance of the first-b electrode 112 may be stably improved. Particularly, since the current flowing through the first-b electrode tab 112*c* is largely dispersed, the resistance generated in the first-b electrode tab 112*c* may be significantly reduced.

The electrode assembly 100 according to the first embodiment of the present invention comprises an electrode lead 130, and the electrode lead 130 comprises a first electrode lead 131, to which the first-a and the first-b electrode tab

112*c* of the first-a electrode 111 are bonded, and a second electrode lead 132 to which the second electrode tab 121 of the second electrode 120 is bonded.

Here, the electrode lead 130 is bonded to the first electrode lead 131 in a state in which the first-a electrode tab 111*c* and the first-b electrode tab 112*c* are separated from each other so that the current flows. That is, the first-a electrode tab 111*c* is bonded to one side of the first electrode lead 131, and the first-b electrode tab 112*c* is bonded to the other side of the first electrode lead 131. Thus, since the first-a electrode tab 111*c* and the first-b electrode tab 112*c* is not in contact with each other, the current may flow to each of the first-a electrode tab 111*c* and the first-b electrode tab 112*c*, and thus, a large amount of current is induced to flow to the first-b electrode 112.

The first electrode 110 is a negative electrode, and the second electrode 120 is a positive electrode.

The electrode assembly 100 having the above-described structure according to the first embodiment of the present invention may satisfy both the output performance and the energy density, and as a result, efficiency and usability of the electrode assembly may be significantly improved.

Hereinafter, a method for manufacturing the electrode assembly according to the first embodiment of the present invention will be described.

Figure 9:
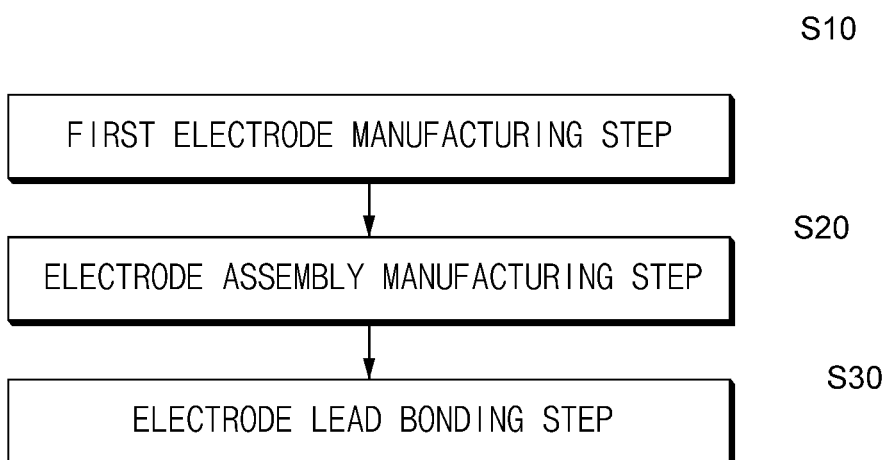
FIG. 9 is a flowchart illustrating a method for manufacturing the electrode assembly according to the first embodiment of the present invention.

Method for Manufacturing Electrode Assembly According to First Embodiment of the Present Invention As illustrated in FIG. 9, an electrode assembly 100 according to the first embodiment of the present invention comprises a first electrode manufacturing step (S10) of manufacturing a first electrode 110 comprising a first-a electrode 111 and a first-b electrode 112, in which electrode active material layers have thicknesses different from each other, an electrode assembly manufacturing step (S20) of alternately stacking the second electrode 120 and the first-a electrode 111 or the first-b electrode 112 of the first electrode 110 with a separator 130 therebetween to manufacture the electrode assembly 100, and an electrode lead bonding step (S30) of bonding the electrode lead 130 to the first and second electrodes.

First Electrode Manufacturing Step

The first electrode manufacturing step (S10) is performed to manufacture the first-a electrode and the first-b electrode, in which the electrode active material layers have the thicknesses different from each other and comprises a process of preparing a plurality of collectors having the same area and a process of manufacturing the first-a electrode 111 and the first-b electrode 112, in which the electrode active material layers have the same area and different thicknesses, by changing a loading amount of electrode active material on a surface of each of the collectors.

The first-a electrode 111 increases in loading amount of electrode active material rather than that of electrode active material of the first-b electrode 112 to manufacture an electrode active material layer having a thickness greater than that of the first-b electrode 112.

For example, the electrode active material is loaded to a first thickness α on the surface of the collector to manufacture the first-a electrode 111, in which the electrode active material layer has the first thickness α.

The first-b electrode 112 decreases in loading amount of electrode active material rather than that of electrode active material of the first-a electrode 111 to manufacture an electrode active material layer having a thickness less than that of the first-a electrode 111.

For example, the electrode active material is loaded to a second thickness β, which is less than the first thickness α, on the surface of the collector to manufacture the first-b electrode 112, in which the electrode active material layer has the second thickness β.

Here, since the loading amount of electrode active material in the first-a electrode 111 is greater than that in the first-b electrode 112, the energy density is high, and since the loading amount of electrode active material in the first-b electrode 112 is less than in the first-a electrode 111, the output performance is high.

On the other hand, if 25 sheet of first electrode and 25 sheets of second electrode are stacked to manufacture the electrode assembly, 22 sheets of first-a electrode and 3 sheets of first-b electrode are manufactured.

The first electrode manufacturing step (S10) further comprises an electrode tab manufacturing process. In the electrode tab manufacturing process, non-coating portions, on which the electrode active material does not exist, of the first-a electrode 111 and the first-b electrode 112 are cut to manufacture a first-a electrode tab 111c and a first-b electrode tab 112c.

Here, in order to induce a large amount of current to flow preferentially to the first-b electrode tab 112c of the first-b electrode 112 having high output performance, the first-b electrode tab 112c has a width greater than that of the first-a electrode tab 111c.

Electrode Assembly Manufacturing Step

In the electrode assembly manufacturing step (S20) performed to manufacture the electrode assembly, the second electrode 120 and the first electrode 110 are alternately stacked with the separator 130 therebetween to manufacture the electrode assembly 100. Here, the first-a electrode 111 or the first-b electrode 112 is stacked on a portion on which the first electrode 110 is stacked. That is, if it needs to increase in energy density, the first-a electrode 111 is stacked more than the first-b electrode 112, and if it needs to significantly increase in output performance, the first-b electrode 112 is stacked more than the first-a electrode 111.

Therefore, it is possible to manufacture the electrode assembly having the energy density greater than the output performance or the electrode assembly having the output performance greater than that energy density. Particularly, if the number of first-a electrode 111 and first-b electrode 112 stacked on the electrode assembly is adjusted, the electrode assembly in which the energy density and the output performance are more effectively adjusted may be manufactured.

Particularly, in the electrode assembly manufacturing step (S20), the first-b electrode 112 is stacked in number less than that of first-a electrode 111. That is, since the energy density of the electrode assembly is more important than the output performance in the electrode assembly, the first-a electrode 111 is stacked more than the first-b electrode 112, and thus the energy density of the electrode assembly may be sufficiently secured.

As an example, referring to FIG. 1, in the electrode assembly manufacturing step (S20), one or more radical units are provided. Here, each of the radical units has a 12-layered structure, in which the second electrode 120, the separator 130, the first-a electrode 111, the separator 130, the second electrode 120, the separator 130, the first-a electrode

111, the separator, the second electrode 120, the separator 130, the first-b electrode 112, and the separator are sequentially stacked in a vertical direction.

After the electrode assembly manufacturing step (S20), the electrode lead bonding step (S30) is performed.

Electrode Lead Bonding Step

In the electrode lead bonding step (S30), the first-a electrode tab 111c and the first-b electrode tab 112c are bonded to the first electrode lead 131, and the second electrode tab 121 is bonded to the second electrode lead 132.

Here, in the electrode lead bonding step (S30), the first-a electrode tab 111c and the first-b electrode tab 112c are bonded to one side and the other side of the first electrode lead 131, respectively, without being in contact with each other.

When the electrode lead bonding step (S30) is completed as described above, a finished electrode assembly 100 may be manufactured. Particularly, it is possible to manufacture the finished electrode assembly 100 having the high energy density and output performance.

Hereinafter, in descriptions of another embodiment of the present invention, constituents having the same function as the above-mentioned embodiment have been given the same reference numeral in the drawings, and thus duplicated description will be omitted.

Electrode Assembly According to Second Embodiment of the Present Invention

Figure 10:
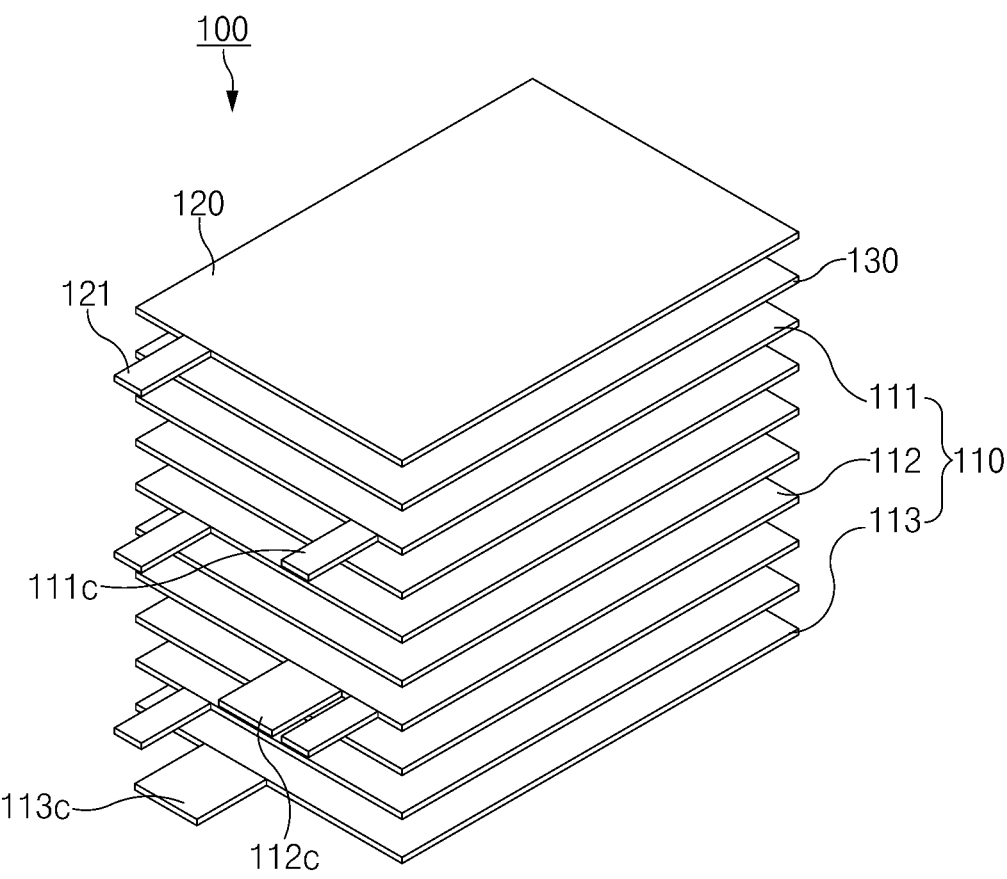
FIG. 10 is an exploded perspective view of an electrode assembly according to a second embodiment of the present invention.
Figure 11:
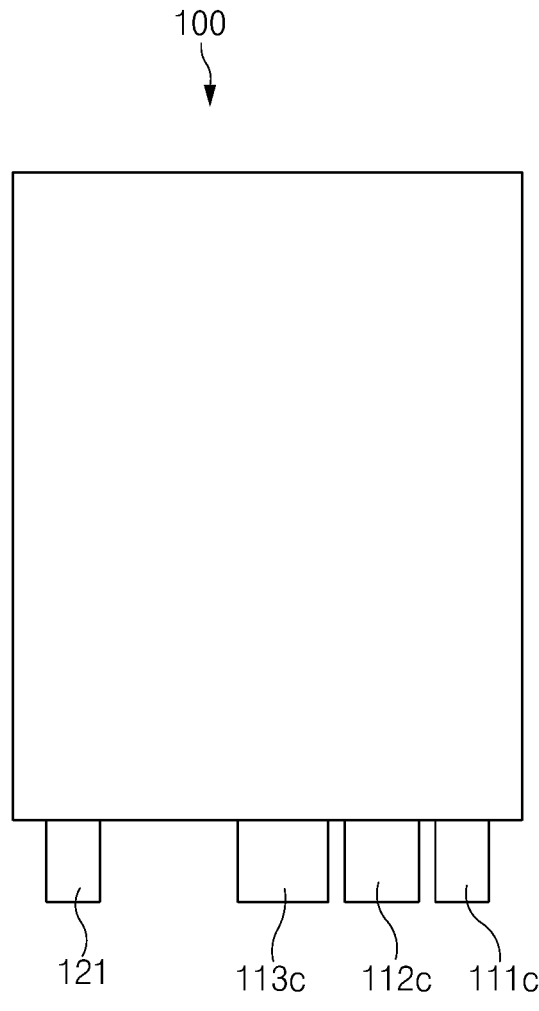
FIG. 11 is a plan view of the electrode assembly according to the second embodiment of the present invention.

As illustrated in FIGS. 10 to 11, an electrode assembly 100 according to a second embodiment of the present invention has a structure in which a first electrode 110 and a second electrode 120 are alternately stacked with the separator 130 therebetween. Also, the first electrode 110 comprises a first-a electrode 111 and a first-b electrode 112.

Here, the first electrode 110 further comprises a first-c electrode 113 having the same area as each of the first-a electrode 111 and the first-b electrode 112 and having an electrode active material layer having a thickness different from that of each of the first-a electrode 111 and the first-b electrode 112.

Particularly, the first-c electrode 113 has an electrode active material layer having a thickness less than that of the first-b electrode 112, and thus output performance may be significantly improved compared to the first-b electrode 112.

That is, in the electrode assembly 100 according to the second embodiment of the present invention, if the first electrode 110 is disposed in an order of the thickness of the electrode active material layer, an order of the first-a electrode 111>the first-b electrode 112>the first-c electrode 113 becomes.

The first-c electrode 113 comprises a first-c electrode tab 113c, and the first-c electrode tab 113c has a width greater than that of the first-b electrode tab 112c. Thus, the first-c electrode 113 may induce current to flow preferentially rather than the first-b electrode 112, and thus output performance may be improved to be higher than that of the first-b electrode 112.

Therefore, the electrode assembly 100 according to the second embodiment of the present invention comprises a third electrode 113 provided with a third electrode tab 113c. Due to the above-described characteristics, energy density and output performance may be further subdivided.

Secondary Battery According to Third Embodiment
of the Present Invention

Figure 12:
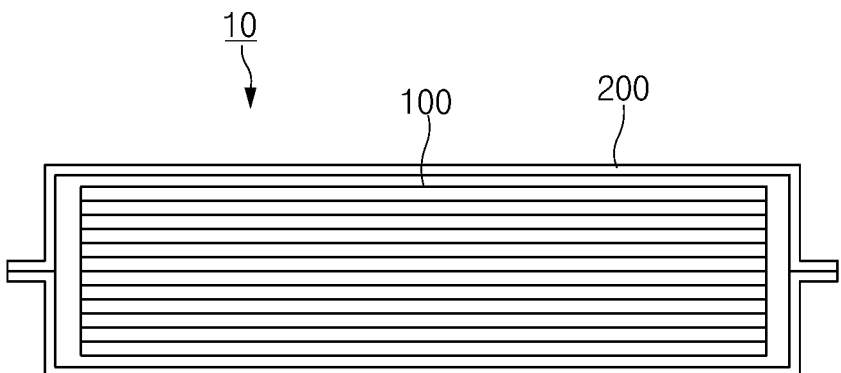
FIG. 12 is a cross-sectional view of a secondary battery according to a third embodiment of the present invention.

As illustrated in FIG. 12, a secondary battery 10 according to a third embodiment of the present invention comprises an electrode assembly 100 and a case 200 accommodating the electrode assembly 100.

Here, the electrode assembly 100 has the same configuration as the electrode assembly 100 according to the foregoing first embodiment, and thus, duplicated descriptions thereof will be omitted.

Therefore, the secondary battery 10 according to the third embodiment of the present invention may obtain both energy density and output performance, and as a result, battery performance may be improved.

Experimental Example

Manufacturing Example

In Manufacturing Example, a secondary battery comprising an electrode assembly, in which a first electrode and a second electrode are alternately stacked with a separator therebetween, is prepared. Here, the first electrode comprises a first-a electrode and a first-b electrode, in which electrode active material layers have different thicknesses, and in particular, the electrode active material layer of the first-a electrode has a thickness greater than that of the electrode active material layer of the first-b electrode. That is, in Manufacturing Example, a secondary battery comprising two types of first electrodes, in which the electrode active material layers have different thicknesses, is prepared.

In Manufacturing Example, the electrode assembly has the same structure as the electrode assembly according to the first embodiment of the present application.

After applying a voltage to the secondary battery having the above-described structure according to Manufacturing Example, output performance is measured.

Comparative Example

In Comparative Example, a secondary battery comprising an electrode assembly, in which a first electrode and a second electrode are alternately stacked with a separator therebetween, is prepared. That is, in Comparative Example, a secondary battery comprising one type of first electrode, in which electrode active material layers have the same thickness, is prepared.

After applying a voltage to the secondary battery having the above-described structure according to Comparative Example, output performance is measured.

Experimental Results

Figure 13:
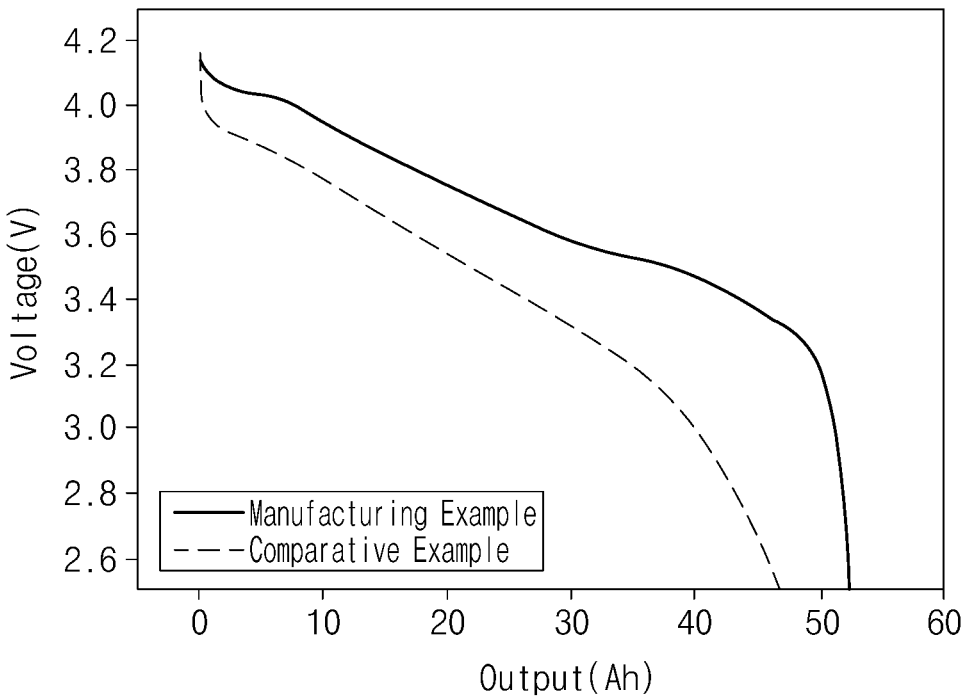
FIG. 13 is a graph illustrating experimental examples according to the present invention.

As experimental results of Manufacturing Example and Comparative Example, a graph as illustrated in FIG. 13 may be obtained.

Referring to FIG. 13, it is seen that the output performance in Manufacturing Example is significantly improved compared to that in Comparative Example. That is, it is seen that initial output performance in Manufacturing Example is about 53 Ah, and initial output performance in Comparative Example is about 47 Ah.

Therefore, it is seen that the output performance in Manufacturing Example is significantly improved compared to that in Comparative Example.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

Description of the Symbols

100: Electrode assembly
110: First electrode
111: First-a electrode
111*c*: First-a electrode tab
112: First-b electrode
112*c*: First-b electrode tab
113: First-c electrode
120: Second electrode
130: Electrode lead
131: First electrode lead
132: Second electrode lead

The invention claimed is:

1. An electrode assembly, comprising:
a first electrode having a first electrode active material layer and a second electrode having a second electrode active material layer are alternately stacked with a separator therebetween,
wherein the first electrode comprises a plurality of first-a electrodes and a plurality of first-b electrodes, in which the first electrode active material layer of each first-a electrode is thicker than the first electrode active material layer of each first-b electrode,
wherein each first-a electrode and each first-b electrode comprise a first-a electrode tab and a first-b electrode tab, respectively,
wherein the first-b electrode tab has a width greater than a width of the first-a electrode tab,
wherein the first-a electrode tab and the first-b electrode tab do not overlap in a stacking direction,
wherein the first-b electrode tab and the first-a electrode tab are bonded to a first electrode lead,
wherein the first-b electrode tab and the first-a electrode tab are respectively bonded to a first side and a second side of the first electrode lead without being in direct contact with each other,
wherein the first electrode lead has a first section having a width equal to a greatest width between a side edge of the first-b electrode tab and a side edge the first-a electrode tab and a second section having a width less than the first section, and
wherein a number of the plurality of first-a electrodes is twice a number of the plurality of first-b electrodes.
2. The electrode assembly of claim 1, wherein the first electrode active material layer of each first-a electrode and the first electrode active material layer of each first-b electrode have the same area.
3. The electrode assembly of claim 1, further comprising:
a second electrode lead, to which a second electrode tab of the second electrode is bonded.
4. The electrode assembly of claim 1, wherein the first electrode further comprises a first-c electrode having a same area as each of the first-a electrodes and the first-b electrodes and having a first electrode active material layer, which has a thickness different from that of the first electrode active material layer of each of the first-a electrodes and the first-b electrodes, and wherein the first electrode active material layer of the first-c electrode has a thickness less than the thickness of the first electrode active material layer of the first-b electrodes.

5. The electrode assembly of claim 4, wherein the first-c electrode comprises a first-c electrode tab, and wherein the first-c electrode tab has a width greater than the width of the first-b electrode tab.

6. A method for manufacturing an electrode assembly, the method comprising:

a first electrode manufacturing step of manufacturing a first electrode comprising a plurality of first-a electrodes and a plurality of first-b electrodes, in which electrode active material layers have different thicknesses; and an electrode assembly manufacturing step of alternately stacking a second electrode and the first-a electrode or the first-b electrode of the first electrode with a separator therebetween to manufacture the electrode assembly, wherein, in the first electrode manufacturing step, non-coating portions, on which the electrode active material does not exist, of the first-a electrode and the first-b electrode are cut to manufacture a first-a electrode tab and a first-b electrode tab, wherein the first-b electrode tab has a width greater than a width of the first-a electrode tab and the first-a electrode tab and the first-b electrode tab do not overlap in a stacking direction, after the electrode assembly manufacturing step, an electrode lead bonding step of bonding the first-a electrode tab and the first-b electrode tab to a first electrode lead and bonding a second electrode tab of the second electrode to a second electrode lead, wherein the first-a electrode tab and the first-b electrode tab are respectively bonded to a first side and a second side of the first electrode lead without being in direct contact with each other, wherein the first-b electrode tab and the first-a electrode tab are respectively bonded to a first side and a second side of the first electrode lead without being in direct contact with each other, wherein the first electrode lead has a first section having a width equal to a greatest width between a side edge of the first-b electrode tab and a side edge the first-a electrode tab and a second section having a width less than the first section, and wherein a number of the plurality of first-a electrodes is twice a number of the plurality of first-b electrodes.

7. The method of claim 6, wherein the first electrode manufacturing step comprises preparing a plurality of collectors having a same area and changing a loading amount of electrode active material on a surface of each of the plurality of collectors, wherein the first-a electrode increases in loading amount of electrode active material compared to the electrode active material of the first-b electrode to manufacture an electrode active material layer having a thickness greater than that of the first-b electrode, and wherein the first-b electrode decreases in loading amount of electrode active material compared to the electrode active material of the first-a electrode to manufacture an electrode active material layer having a thickness less than that of the first-a electrode.

8. A secondary battery comprising:

the electrode assembly of claim 1; and a case configured to accommodate the electrode assembly.

* * * * *